(12) United States Patent
Luo et al.

(10) Patent No.: US 12,265,232 B2
(45) Date of Patent: Apr. 1, 2025

(54) BEAM-SPLITTING OPTICAL MODULE AND MANUFACTURING METHOD THEREOF

(71) Applicant: Hangzhou UPhoton Optoelectronics Technology Co., Ltd., Zhejiang Province (CN)

(72) Inventors: Qun Luo, Zhejiang Province (CN); Xingpeng Yang, Zhejiang Province (CN); Ming Yuan, Zhejiang Province (CN)

(73) Assignee: Hangzhou UPhoton OPtoelectronics Technology Co., Ltd., Zhejiang Province (CN)

( * ) Notice: Subject to any disclaimer, the term of this patent is extended or adjusted under 35 U.S.C. 154(b) by 855 days.

(21) Appl. No.: 17/431,060

(22) PCT Filed: Jan. 10, 2020

(86) PCT No.: PCT/CN2020/071453
§ 371 (c)(1),
(2) Date: Aug. 13, 2021

(87) PCT Pub. No.: WO2020/164346
PCT Pub. Date: Aug. 20, 2020

(65) Prior Publication Data
US 2022/0075200 A1 Mar. 10, 2022

(30) Foreign Application Priority Data

Feb. 14, 2019 (CN) .......................... 201910114770.1
Feb. 14, 2019 (CN) .......................... 201920197392.3

(51) Int. Cl.
*G02B 27/42* (2006.01)
*G02B 27/10* (2006.01)
*G02B 27/28* (2006.01)

(52) U.S. Cl.
CPC ..... *G02B 27/4233* (2013.01); *G02B 27/1086* (2013.01); *G02B 27/283* (2013.01)

(58) Field of Classification Search
CPC ............ G02B 27/4233; G02B 27/1086; G02B 27/283
(Continued)

(56) References Cited

U.S. PATENT DOCUMENTS 5,085,496 A * 2/1992 Yoshida ................. G02B 1/118
359/569
5,257,131 A * 10/1993 Yoshida ............... G02B 5/1814
250/237 G
(Continued)

FOREIGN PATENT DOCUMENTS

CN 1538414 A 10/2004
CN 101140771 A 3/2008
(Continued)

OTHER PUBLICATIONS

PCT/CN2020/071453, International Search Report mailed Apr. 13, 2020, 8 pages.
(Continued)

*Primary Examiner* — Ricky D Shafer
(74) *Attorney, Agent, or Firm* — Meunier Carlin & Curfman LLC

(57) ABSTRACT

A beam-splitting optical module (100), comprising: a light-emitting device (101); and a diffractive optical element (103), wherein the diffractive optical element (103) is provided in a light exit path of the light-emitting device (101), and is configured to modulate incident light to project at least two groups of light beams, and can form, on a target surface (105), at least two groups of light spots, the number of groups of which corresponds to that of the light beams, wherein polarization directions of at least two groups of (Continued)

light beams are different, and/or optical distances from the light-emitting device (101) to the target surface (105) are different.

13 Claims, 7 Drawing Sheets

(58) Field of Classification Search
USPC .................................................. 359/492.01
See application file for complete search history.

(56) References Cited

U.S. PATENT DOCUMENTS

| | | | |
|---|---|---|---|
| 6,556,320 B1* | 4/2003 | Cao ........................ | G02B 6/278 |
| | | | 359/489.05 |
| 7,088,513 B2 | 8/2006 | Tanaka et al. | |
| 7,706,235 B2 | 4/2010 | Yim | |
| 9,159,167 B2 | 10/2015 | Tuukkanen | |
| 11,269,193 B2* | 3/2022 | Chen ..................... | H04N 13/254 |
| 11,740,483 B2* | 8/2023 | Wang ................. | G02B 27/0012 |
| | | | 359/558 |
| 11,774,238 B2* | 10/2023 | Yin ........................ | G06V 40/16 |
| | | | 356/610 |
| 2008/0074963 A1 | 3/2008 | Nagatomi et al. | |
| 2008/0106789 A1* | 5/2008 | Hirai .................... | G02B 5/3083 |
| | | | 359/489.08 |
| 2016/0154247 A1* | 6/2016 | Liu ........................ | G02B 6/32 |
| | | | 359/489.08 |
| 2016/0164258 A1 | 6/2016 | Weichmann et al. | |
| 2016/0265906 A1 | 9/2016 | Yamashita et al. | |
| 2019/0162981 A1* | 5/2019 | Chen ..................... | G02B 27/425 |
| 2020/0232789 A1 | 7/2020 | Engel et al. | |

FOREIGN PATENT DOCUMENTS

| | | |
|---|---|---|
| CN | 101154406 A | 4/2008 |
| CN | 102933934 A | 2/2013 |
| CN | 104280801 A | 1/2015 |
| CN | 106773489 A | 5/2017 |
| CN | 107589622 A | 1/2018 |
| CN | 108169981 A | 6/2018 |
| CN | 109669271 A | 4/2019 |
| CN | 209728341 U | 12/2019 |
| DE | 102017202652 A1 | 8/2018 |
| EP | 3282285 A1 | 2/2018 |
| WO | 2005121900 A1 | 12/2005 |

OTHER PUBLICATIONS

PCT/CN2020/071453, Written Opinion of the International Search Report mailed Apr. 13, 2020, 4 pages.
Nieuborg N. et al. "Polarization-selective diffractive optical elements with an index-matching gap material", Applied Optics, vol. 36, No. 20, Jul. 10, 1997, p. 4681-4685.
Extended European Search Report issued in EP 20756111.9, mailed Oct. 13, 2022.
Communication pursuant to Article 94(3) EPC issued in EP20756111. 9, mailed May 15, 2024.

* cited by examiner

BEAM-SPLITTING OPTICAL MODULE AND MANUFACTURING METHOD THEREOF

TECHNICAL FIELD

The present invention relates to the technical field of optics, especially to the technical field of the modulation and projection of a diffractive optical element.

BACKGROUND

At present, mobile phone manufacturers gradually begin to adopt the structured light three-dimensional sensing technology. The structured light is an active triangulation technology, and the basic principle of the same lies in using a laser projector to project controllable photoelectricity, optical strip or optical surface onto the surface of an object to form a feature point, using a camera to take an image to obtain a projection angle of the feature point, then calculating the distance between the feature point and the main point of the camera lens according to the calibrated space direction and position parameters under the triangulation principle, and obtaining a 3D shape of the sensed object so as to complete facial recognition, 3D modeling, etc. Currently, the common structured light three-dimensional sensing technology involves a pattern (dot matrix, or speckle) projection module and an imaging module, as described in PrimeSense's U.S. Pat. No. 9,825,425. As compared with two-dimensional recognition, three-dimensional recognition has been significantly improved in precision, which approaches or exceeds the recognition accuracy of human eyes and shows great commercial value. According to the paper published in Optics Express, Xiao Huang et al. proposed to improve the recognition accuracy of 3D modeling in the complex background light environment by coding with polarized structured light.

The current solutions concerning structured light are mainly applied to Face ID for facial unlocking and payment, Apple Pay for mobile payment and other mobile phone applications and safe payment products (e.g., cash registers), facial recognition products (e.g., authentication comparison, and gate machines), security products (e.g., smart door locks), unmanned malls and supermarkets and other non-mobile applications, and such scenarios require higher recognition accuracy. Therefore, each manufacturer has an urgent demand for how to improve the recognition accuracy. Now the main structural component DOE of a structured light projection module is limited by the manufacturing capacity, therefore the minimum characteristic size cannot be further reduced, resulting in the situation that the feature point density, point size and quantity in a speckle pattern cannot be improved. According to the existing technical solutions, polarized light is usually generated by using multiple modules or a complex system (e.g., a liquid crystal display module LCD), and passes through the DOE to form a dot matrix, and then more 3D information is extracted. No solution has been put forward for now to compact, low-cost polarized structured light. However, miniaturized and low-cost solutions are of great importance for the consumer electronics industry.

The contents in the Background are merely the technologies known by the inventors, and does not necessarily represent the prior art in the field.

SUMMARY OF THE INVENTION

For this purpose, the present invention provides a beam-splitting optical module, comprising: a light-emitting device; and a diffractive optical element, wherein the diffractive optical element is provided in a light exit path of the light-emitting device, and is configured to modulate incident light to project at least two groups of light beams, and form, on a target surface, at least two groups of light spots, the number of groups of which corresponds to that of the light beams, wherein polarization directions of the at least two groups of light beams are different, and/or optical distances from the light-emitting device to the target surface are different.

In accordance with one aspect of the present invention, a polarization modulation element is provided between the light-emitting device and the diffractive optical element, the polarization modulation element being configured to modulate light emitted from the light-emitting device into at least two groups of polarized light in different polarization directions, the number of groups of which corresponds to that of the at least two groups of light beams, and the diffractive optical element being configured to modulate the at least two groups of polarized light so as to project the at least two groups of light beams, wherein the polarization modulation element is preferably a polarization grating and/or a polarizing film, and the light-emitting device is preferably a vertical cavity surface emitting laser or an edge emitting laser or an LED. In the examples of the present invention, the properties of polarized light are used to optimize and design a DOE, which can reduce the size of feature points, and can multiply the number of feature points, so as to improve the recognition accuracy. In the present invention, a diffractive optical structure is made on the chip surface of a semiconductor light-emitting device (e.g., a VCSEL, or an LED) to control the light-emitting cavity to generate specific polarized light. For example, the diffractive grating structure is designed for the VCSEL light source point to make the same generate two groups of polarized light. Each group of polarized light passes through the DOE optimized and designed in polarization to project a pattern of a group of feature points. As compared with the traditional solutions, the number of points is doubled, which can significantly improve the recognition accuracy.

In accordance with one aspect of the present invention, the diffractive optical element is configured to project two groups of light beams and form two groups of light spots on the target surface, or project four groups of light beams and form four groups of light spots on the target surface.

In accordance with one aspect of the present invention, the beam-splitting optical module further comprises a beam-splitting element provided between the light-emitting device and the diffractive optical element, and configured to split received light into at least two groups of beam-split light, the number of groups of which corresponds to that of the at least two groups of light beams, and the diffractive optical element is configured to receive the at least two groups of beam-split light, and modulate and project the at least two groups of light beams.

In accordance with one aspect of the present invention, the beam-splitting element is a polarization beam-splitting element which is configured to split the received light into at least two groups of polarized light in different polarization directions.

In accordance with one aspect of the present invention, the beam-splitting element is a non-polarization optical splitter.

In accordance with one aspect of the present invention, the diffractive optical element is configured to modulate incident light in different polarization directions so as to form a pattern with at least two distinguishing groups of light spots on the target surface.

The present invention also provides a light modulation method, comprising: receiving light emitted from a light-emitting device; and modulating the light emitted from the light-emitting device by a diffractive optical element, to project at least two groups of light beams and form, on a target surface, at least two groups of light spots, the number of groups of which corresponds to that of the light beams, wherein polarization directions of the at least two groups of light beams are different, and/or optical distances from the light-emitting device to the target surface are different.

In accordance with one aspect of the present invention, the light modulation method further comprises modulating the light emitted from the light-emitting device into at least two groups of polarized light in different polarization directions by a polarization modulation element, the number of groups of which corresponds to that of the at least two groups of light beams, and he diffractive optical element being configured to modulate the at least two groups of polarized light so as to project the at least two groups of light beams, wherein the polarization modulation element is preferably a polarization grating and/or a polarizing film, and the light-emitting device is preferably a vertical cavity surface emitting laser or an edge emitting laser or an LED In accordance with one aspect of the present invention, the diffractive optical element is configured to project two groups of light beams and form two groups of light spots on the target surface, or project four groups of light beams and form four groups of light spots on the target surface.

In accordance with one aspect of the present invention, the light modulation method further comprises using a beam-splitting element provided between the light-emitting device and the diffractive optical element to split received light into at least two groups of beam-split light, the number of groups of which corresponds to that of the at least two groups of light beams, and the diffractive optical element being configured to receive the at least two groups of beam-split light, and modulate and project the at least two groups of light beams.

In accordance with one aspect of the present invention, the beam-splitting element is a polarization beam-splitting element configured to split the received light into at least two groups of polarized light in different polarization directions; or the beam-splitting element is a non-polarization optical splitter.

In accordance with one aspect of the present invention, the diffractive optical element is configured to modulate incident light in different polarization directions so as to form a pattern of at least two distinguishing groups of light spots on the target surface.

The present invention also provides an electronic device, comprising: a beam-splitting optical module as described above; a camera acquiring a pattern formed by the light spot; and a processing unit receiving and processing the pattern acquired by the camera.

The present invention also provides a manufacturing method of a beam-splitting optical module, comprising: providing a substrate of the optical module; preparing a light-emitting device on the substrate; and forming a diffractive optical element in a light exit path of the light-emitting device, the diffractive optical element being configured to modulate incident light to project at least two groups of light beams and form, on a target surface, at least two groups of light spots, the number of groups of which corresponds to that of the light beams, wherein polarization directions of the at least two groups of light beams are different, and/or optical distances from the light-emitting device to the target surface are different.

In accordance with one aspect of the present invention, the manufacturing method further comprises: providing a polarization modulation element between the light-emitting device and the diffractive optical element, the polarization modulation element being configured to modulate light emitted from the light-emitting device into at least two groups of polarized light in different polarization directions, the number of groups of which corresponds to that of the at least two groups of light beams, and the diffractive optical element being configured to modulate the at least two groups of polarized light so as to project the at least two groups of light beams, wherein the polarization modulation element is preferably a polarization grating and/or a polarizing film, and the light-emitting device is preferably a vertical cavity surface emitting laser or an edge emitting laser or an LED.

In accordance with one aspect of the present invention, the manufacturing method further comprises: providing a beam-splitting element between the light-emitting device and the diffractive optical element, the beam-splitting element being configured to split received light into at least two groups of beam-split light, the number of groups of which corresponds to that of the at least two groups of light beams, and the diffractive optical element being configured to receive the at least two groups of beam-split light, and modulate and project the at least two groups of light beams.

BRIEF DESCRIPTION OF THE DRAWINGS

The drawings are provided for the purpose of further understanding the present invention, and constitute part of the present invention, which should serve to illustrate the present invention together with the embodiments, but do not make any inappropriate limitation of the present invention. In the drawings.

DETAILED DESCRIPTION OF THE EMBODIMENTS OF THE INVENTION

Figure 1:
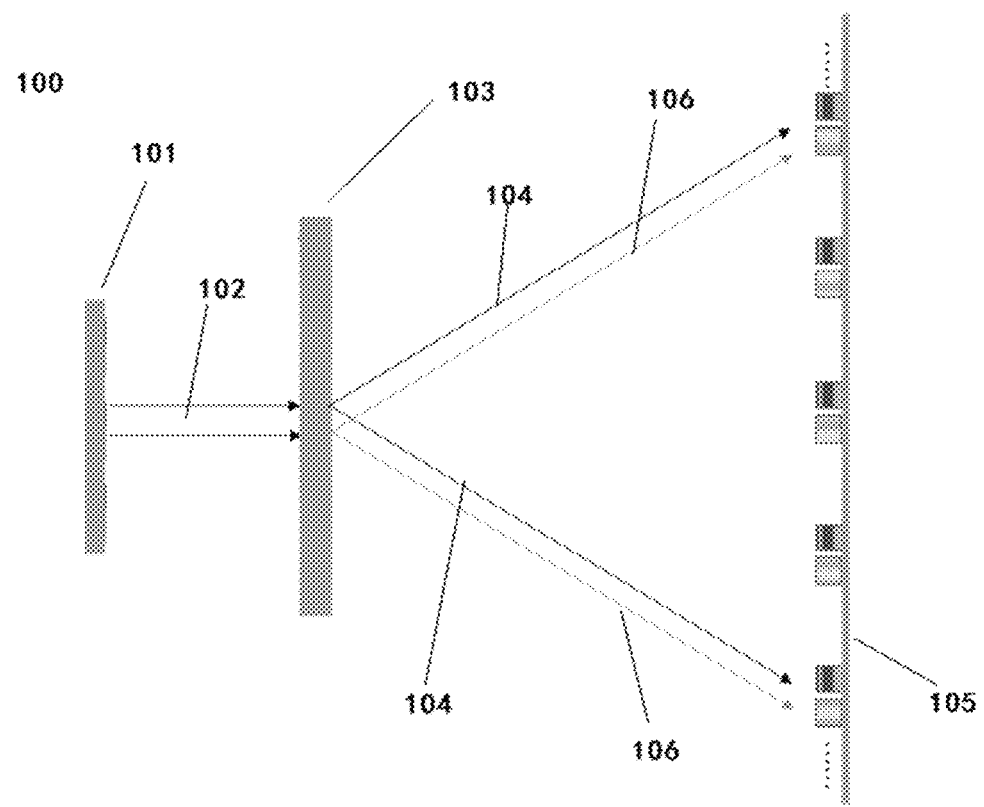
FIG. 1 illustrates a beam-splitting optical module according to the first example of the present invention.

Certain exemplary examples will be described below only in a brief manner. Just as those skilled in the art will appreciate, changes in various ways to the examples described herein can be carried out without departing from the spirit or scope of the present invention. Therefore, the drawings and the following description are deemed essentially exemplary, instead of limitative.

In the description of the present invention, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the present invention and simplification of the description, instead of indicating or suggesting that the denoted devices or elements must be specifically oriented, or configured or operated in some specific orientation. Thus, such terms should not be construed to limit the present invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present invention, "more" means two or above, unless otherwise defined explicitly and specifically.

In the description of the present invention, it needs to be noted that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, this may cover the direct contact between the first and second features, also cover the contact via another feature therebetween, instead of the direct contact. Furthermore, if a first feature "above", "over" or "on the top of" a second one, this may cover that the first feature is right above or on the inclined top of the second feature, or just indicate that the first feature has a horizontal height higher than that of the second feature. If a first feature is "below", "under" or "on the bottom of" a second feature, this may cover that the first feature is right below and on the inclined bottom of the second feature, or just indicates that the first feature has a horizontal height lower than that of the second feature.

The disclosure below provides many different embodiments and examples so as to achieve different structures described herein. In order to simplify the disclosure herein, the following will give the description of the parts and arrangements embodied in specific examples. Surely, they are just for the exemplary purpose, not intended to limit the present invention. Besides, the present invention may repeat a reference number and/or reference letter in different examples, and such repeat is for the purpose of simplification and clarification, which does not represent any relation among various embodiments and/or arrangements as discussed. In addition, the present invention provides examples for a variety of specific techniques and materials, but those skilled in the art can be aware of applications of other techniques and/or use of other materials.

The preferred examples of the present invention will be introduced below along with the drawings. It should be understood that the preferred examples described herein are only for the purpose of illustrating and explaining, instead of restricting, the present invention.

FIG. 1 illustrates a beam-splitting optical module 100 according to the first example of the present invention. As shown in FIG. 1, the beam-splitting optical module 100 comprises: a light-emitting device 101 and a diffractive optical element DOE 103. The diffractive optical element 103 is provided in a light exit path of the light-emitting device 101, and configured to modulate incident light to project at least two groups of light beams and form, on a target surface 105, at least two groups of light spots, the number of groups of which corresponds to that of the light beams, wherein polarization directions of the at least two groups of light beams are different, and/or optical distance from the light-emitting device 101 to the target surface 105 are different. More details will be described below.

As shown in FIG. 1, the light-emitting device 101 may be a polarized light source or a non-polarized light source. The light-emitting device 101 emits light beams 102, and the diffractive optical element 103 modulates the incident light and projects a first group of light beams 104 and a second group of light beams 106, forming two corresponding groups of light spots on the target surface 105. Among them, the first group of light beams 104 and the second group of light beams 106 differ from each other in some optical properties, for example the polarization directions are different, and/or optical distance from the light-emitting device 101 to the target surface 105 are different. In addition to the polarization direction and optical distance, those skilled in the art can devise and adopt other optical properties. These are all within the scope of the present invention. The target surface 105 therein may be a human face, or other surfaces to be recognized or irradiated, which can be either planar or curved. Meanwhile, those skilled in the art can understand that the first group of light beams and the second group of light beams herein are relative terms. As described above, different groups of light beams are different from each other in some optical properties, while the light beams in the same group are identical in such optical properties, for example the polarization directions are the same and/or the optical distances from the light-emitting device 101 to the target surface 105 are the same.

As compared with the prior art, the beam-splitting optical module 100 of the first example of the present invention can modulate the incident light to project two groups of light spots, both of which do not completely overlap in position, and may carry other information such as polarization information. The density and quantity of the feature points in a speckle pattern are further increased by the solution of the present invention, thereby enhancing the recognition accuracy.

FIG. 1 makes illustration taking two groups of light beams and two groups of light spots as an example. On this basis, those skilled in the art can implement technical solutions concerning more groups of light beams and more groups of light spots. These are all within the scope of the present invention.

The preferred examples of the beam-splitting optical module of the present invention will be described below.

Figure 2:
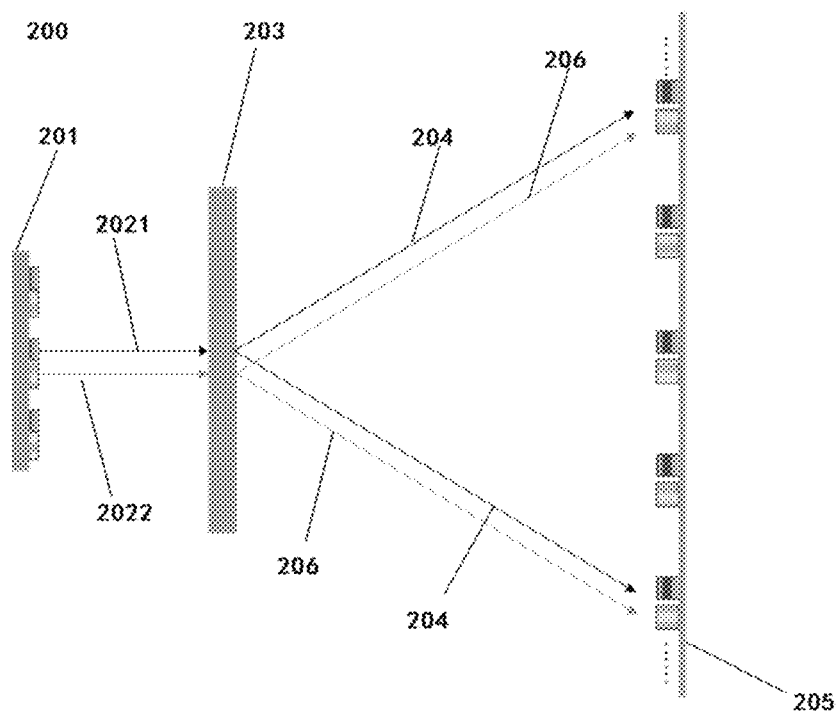
FIG. 2 illustrates a beam-splitting optical module according to the second example of the present invention.

FIG. 2 illustrates a beam-splitting optical module 200 according to the second example of the present invention. As shown in FIG. 2, a light-emitting device 201 emits two groups of polarized light 2021 and 2022, wherein the polarized light 2021 is, for example, polarized light in the X direction and the polarized light 2022 is, for example, polarized light in the Y direction. The polarized light 2021 and polarized light 2022 are incident on a diffractive optical element 203 that is configured to modulate the two groups of polarized light 2021 and 2022 to project two groups of light beams 204 and 206 according to the polarization state of the incident light, and form two groups of light spots on a target surface 205, wherein the polarization directions of light beams 204 and 206 are different.

Figure 3:
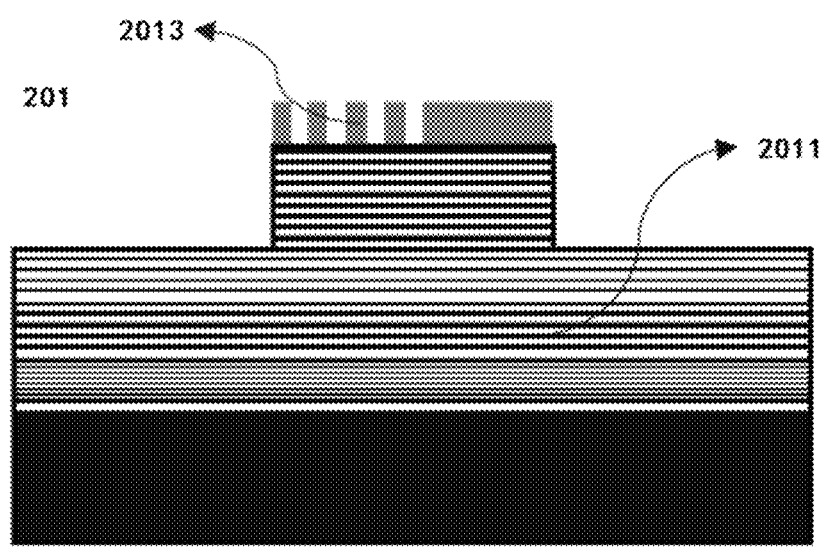
FIG. 3 illustrates one example of the light-emitting device.

FIG. 3 illustrates an example of the light-emitting device 201. As shown in FIG. 3, the light-emitting device 201 comprises a vertical cavity surface emitting laser (VCSEL) 2011 and a polarization modulation element 2013 configured to modulate light emitted from the light-emitting device 201 into at least two groups of polarized light in different polarization directions, the number of groups of which corresponds to that of the at least two groups of light beams, wherein the polarization modulation element 2013 is preferably a polarization grating. Alternatively, the polarization modulation element 2013 may also be formed by attaching polarization films in multiple directions to the vertical cavity surface emitting laser 2011. It is easy to understand that the light-emitting device 201 may further comprise an edge emitting laser or an LED, in addition to the vertical cavity surface emitting laser.

Figure 6:
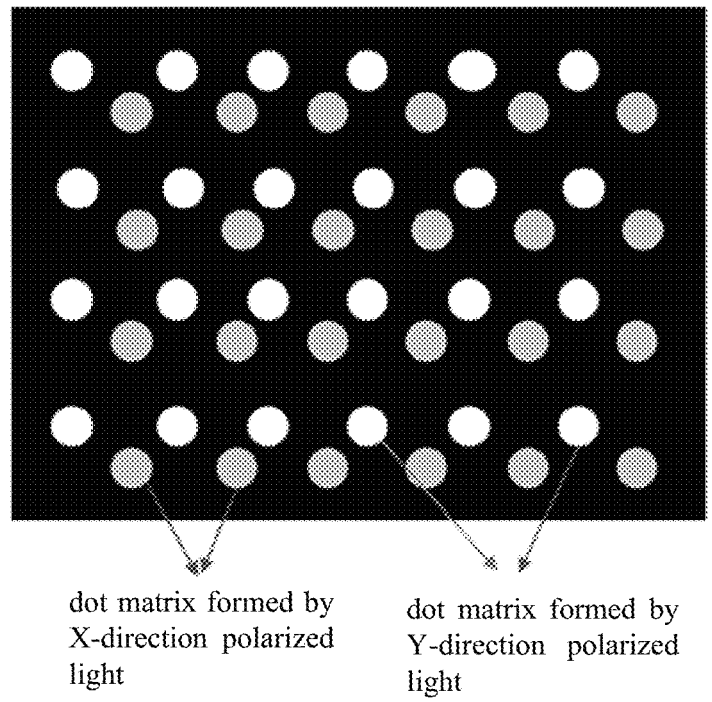
FIG. 6 illustrates a pattern of light spots projected according to one example of the present invention.

According to one example of the present invention, a diffractive optical structure (e.g., a polarization grating) can be made on the chip surface of a semiconductor light-emitting device (e.g., a VCSEL or an LED) to control the light-emitting cavity to generate specific polarized light. For example, a diffractive grating structure is designed for the VCSEL light source point to make the same generate two groups of polarized light. Each group of polarized light passes through the DOE optimized and designed for polarization to project a pattern of a group of feature points. As compared with the traditional solutions, the number of points is doubled, which can significantly improve the recognition accuracy. This example mainly involves the solution of forming a diffractive optical structure on the upper surface of the light-emitting cavity of the VCSEL to enable the VCSEL to emit linearly polarized light in a specific state of polarization. As shown in FIG. 2, the grating is formed on the upper surface of the VCSEL so as to achieve that polarized light in two directions is output by a single point light source of the VCSEL. The optimized and designed DOE elements are combined to form a dot matrix as shown in FIG. 6.

Taking full advantage of the properties of polarized light, this example designs the surface of the VCSEL random light source points into a metasurface to make the same emit linearly polarized light in the X direction and linearly polarized light in the Y direction. Meanwhile, the polarization DOE structure is optimized and designed according to the direction of polarized light to generate two groups of polarization structured light dot arrays. As compared with the traditional design solutions, the number of feature points is doubled. And the size of the feature points can be reduced so as to further improve the density of the feature points.

It is easy to understand that the light-emitting device of this example may comprise a VCSEL light source dot matrix.

The solution described in this example can multiply the feature points of the structured light projection module, and reduce the size of the feature points, thereby improving the recognition accuracy.

If the light emitted from the light source is non-polarized light, it can also be transformed into polarized light in different directions by the polarization modulation element (e.g., polarization grating) on the upper surface of the VCSEL, so that different dot matrix patterns can be formed for different polarization directions.

FIG. 3 shows that light emitted from VCSEL 2011 is modulated by the polarization modulation element 2013 into polarized light in at least two directions. According to the present invention, not only can polarized light be generated by a single polarization modulation element, but also at least two polarization light sources can be directly provided to generate polarized light in at least two directions. These are all within the protection scope of the present invention.

Figure 4:
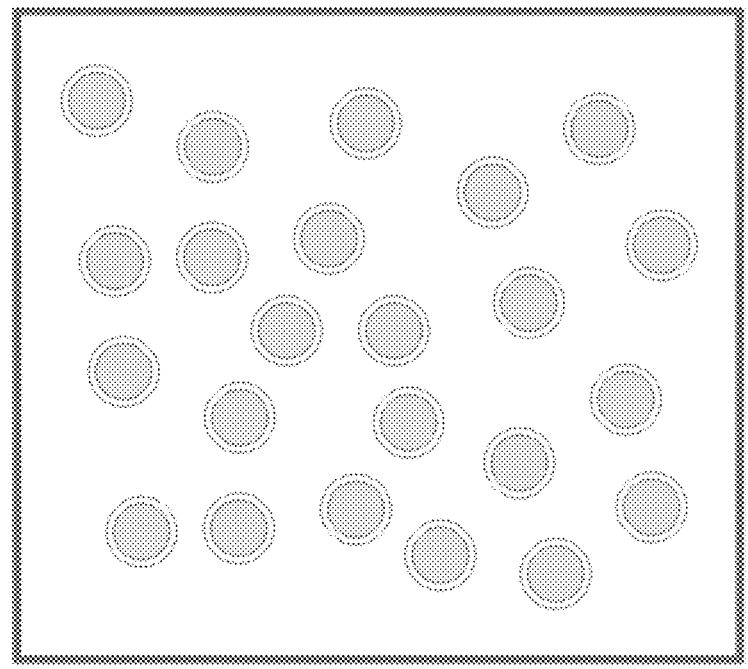
FIG. 4 illustrates a pattern of random light-emitting points of the light-emitting device without the polarization modulation element provided.
Figure 5:
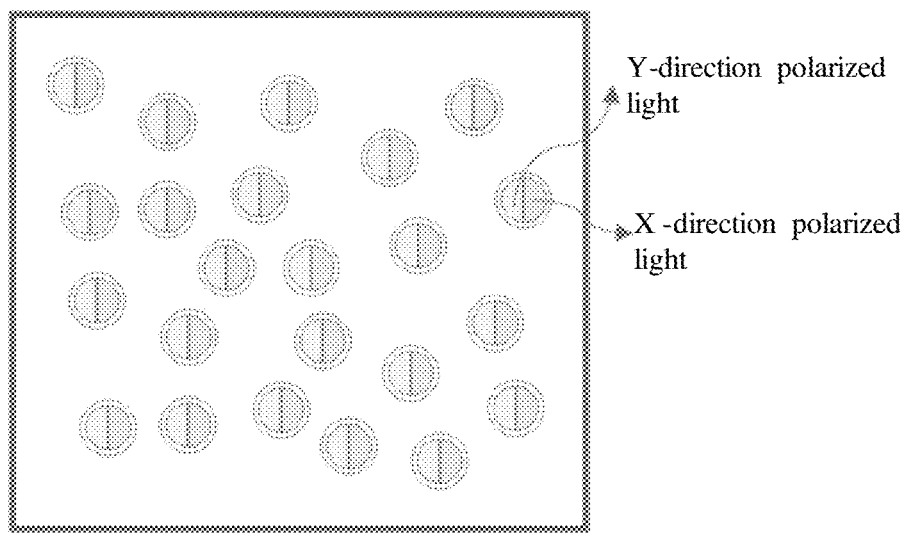
FIG. 5 shows that light emitted from each light-emitting device is modulated into polarized light in two directions after the polarization modulation element is provided.

FIG. 4 illustrates a pattern of random light-emitting points of the vertical cavity surface emitting laser 2011 without the polarization modulation element 2013 provided. FIG. 5 shows that light emitted from each vertical cavity surface emitting laser 2011 is modulated into polarized light in two directions, i.e., X-direction polarized light and Y-direction polarized light respectively, after the polarization modulation element 2013 is provided. And FIG. 6 exhibits that light emitted from the polarization modulation element 2013, after being modulated by the diffractive optical element 203, forms two groups of light spots on the target surface, thus doubling the number of the projected light spots.

The diffractive optical element 203 is configured to modulate incident light in different polarization directions so as to form a pattern of at least two distinguishing groups of light spots on the target surface. "At least two distinguishing groups of light spots" herein means that the two groups of light spots have some difference in some aspects, such as the difference between the positions of the light spots, the difference between the polarization directions of the light beams forming the light spots, and the difference between the optical distances of the light beams from the light sources to the target surface.

Figure 7:
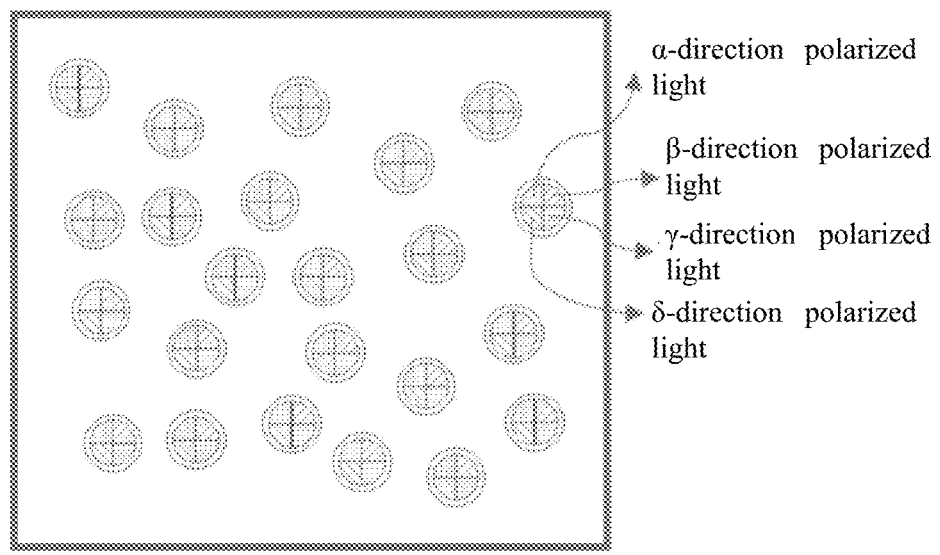
FIG. 7 is a pattern of light spots projected according to an alternative example of the present invention.

The above description is made by taking two groups of polarized light as an example. However, those skilled in the art readily understand that the present invention can be achieved using more groups of polarized light. As shown in FIG. 7, light emitted from each vertical cavity surface emitting laser 2011 is modulated by the polarization modulation element 2013 into polarized light in four directions, i.e., $\alpha$-direction polarized light, $\beta$-direction polarized light, $\gamma$-direction polarized light and $\delta$-direction polarized light respectively, such that a single point light source of the VCSEL can output polarized light in four directions. The diffractive optical element 2013 modulates the polarization directions of the polarized light and projects four groups of light spots, among which the polarization directions of light in each group are different. In this way, as compared with the technical solution of directly projecting the light emitted from the vertical cavity surface emitting laser 2011 to the diffractive optical element 2013, a dot matrix is formed corresponding to each direction of polarized light, and the number of light spots is quadrupled.

The above description is mainly made by taking a vertical cavity surface emitting laser as an example. The light-emitting device 201 is not limited to a vertical cavity surface emitting laser, but also may be other types of polarized or non-polarized light sources.

Figure 8:
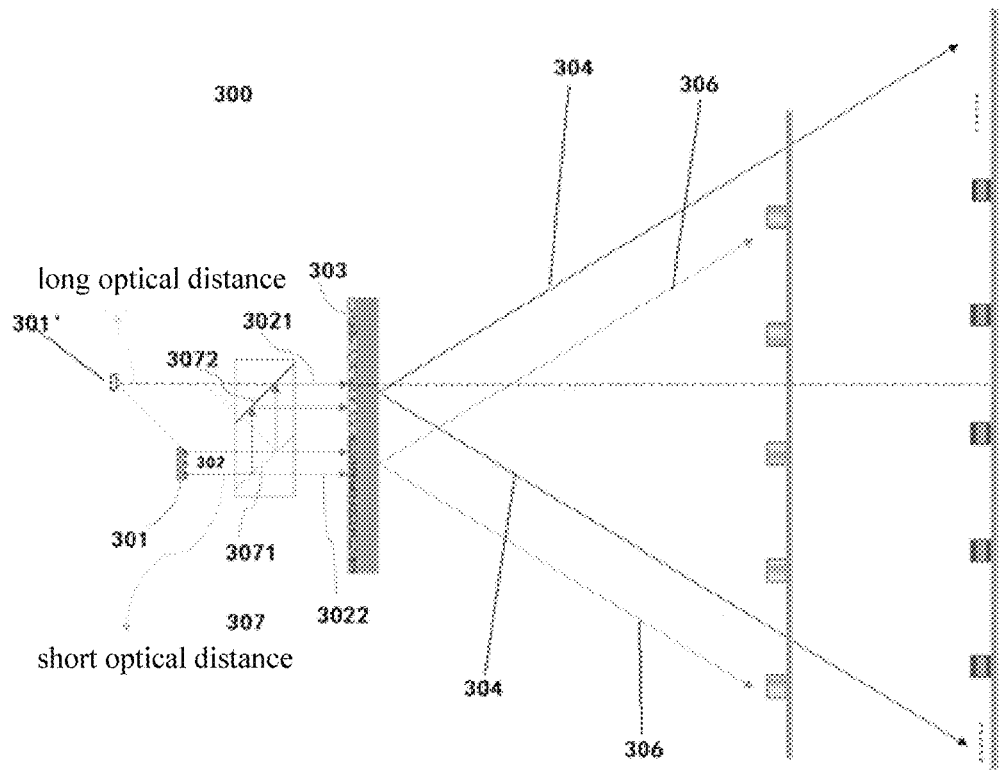
FIG. 8 illustrates a beam-splitting optical module according to an alternative example of the present invention.

FIG. 8 illustrates a beam-splitting optical module 300 according to another preferred example of the present invention. As shown in FIG. 3, in addition to a light-emitting device 301 and a diffractive optical element 303, the beam-splitting optical module 300 further comprises a beam-splitting element 307 provided between the light-emitting device 301 and the diffractive optical element 303, and configured to split received light into at least two groups of beam-split light, the number of groups of which corresponds to that of the at least two groups of light beams. The diffractive optical element 303 is configured to receive the at least two groups of the beam-split light, modulate and project the at least two groups of light beams so as to form, on a target surface 305, at least two groups of light spots corresponding in number.

According to one preferred example, the beam-splitting element 307 is a polarization beam-splitting element configured to split the received light into at least two groups of polarized light in different polarization directions, which incident on the diffractive optical element 303 and exit as at least two groups of light beams in different polarization directions corresponding in number to form a corresponding number of light spots.

According to one preferred example of the present invention, as shown in FIG. 8, the beam-splitting element 307 is a polarization optical splitter comprising a polarization beam-splitting surface 3071 and a reflecting surface 3072. The polarization beam-splitting surface 3071 can make incident light 302 split according to its polarization direction, for example, X-direction polarized light 3022 is refracted to emit on the diffractive optical element 303; and Y-direction polarized light 3021 is reflected by the polarization beam-splitting surface 3071, further reflected by the reflecting surface 3072, and then incident on the diffractive optical element 303. As for the Y-direction polarized light 3021, the virtual image of its light source is denoted by 301'. As shown in FIG. 8, the optical distance of the Y-direction polarized light 3021 is longer, while that of the X-direction polarized light 3022 is shorter.

According to one example, the beam-splitting element 307 may be a non-polarization optical splitter.

With an optical splitter/beam-splitting element provided, the distance between the light-emitting device and the diffractive optical element DOE can be reduced, and meanwhile the number of feature points is increased when a polarization optical splitting device is directly added between the light source and the DOE. If the device is made of a kind of material having a refractive index of 1.5, the optical distance of the polarized light 3022 in polarization direction 1 will be increased by about 50%, and that of the polarized light 3021 in polarization direction 2 will be increased by about 100%. In this way, a dot matrix projection module in which a long focal length is combined with a short focal length can be formed, facilitating an increased working distance. According to the object-image relation, light beams with a long optical distance corresponds to a long focal length, while light beams with a short optical distance corresponds to a short focal length. If the light-emitting device is non-polarization and the beam splitter is a common optical splitter, the aforementioned optical path solution is also applicable. The optical distances of the light beams separated by the optical splitter will be different, resulting in different focal lengths. Taking the embodiment shown in FIG. 8 as an example, for a non-polarization light-emitting device, there may be different microstructures in different areas of the diffractive optical element 303 according to the length of the optical distances of different groups of incident light beams (i.e., different object distances) (for example in FIG. 8, the microstructures of the upper half and the lower half of the diffractive optical element 303 are different, which modulate light beams incident thereon having different optical distances respectively), and corresponding modulation is performed for the incident light beams according to the length of the optical distance, thereby forming different focal lengths. While for a polarization light-emitting device, different microstructures can be provided in different areas on the diffractive optical element 303, such that corresponding modulation is performed for polarized light in different polarization directions. It is also possible to provide different microstructures by areas, as shown in FIGS. 1 and 2, light beams in different polarization directions incident on the diffractive optical element, and the diffractive optical element will perform corresponding modulation according to the polarization direction of the incident light. If the light source is split into more than two beams, the aforementioned optical path solution is also applicable. In FIG. 8, the two groups of light spots are shown being located on different planes, and this does not constitute a limitation of the present invention since the two groups of light spots may also be located on the same plane.

The example of FIG. 8 may be combined with the examples of FIGS. 2-7. For example, the light-emitting device 301 in FIG. 8 may comprise a polarization modulation element so as to modulate light beams from a single point light source into polarized light in multiple directions, for example polarized light in two directions, and further incident on the beam-splitting element 307.

Figure 9:
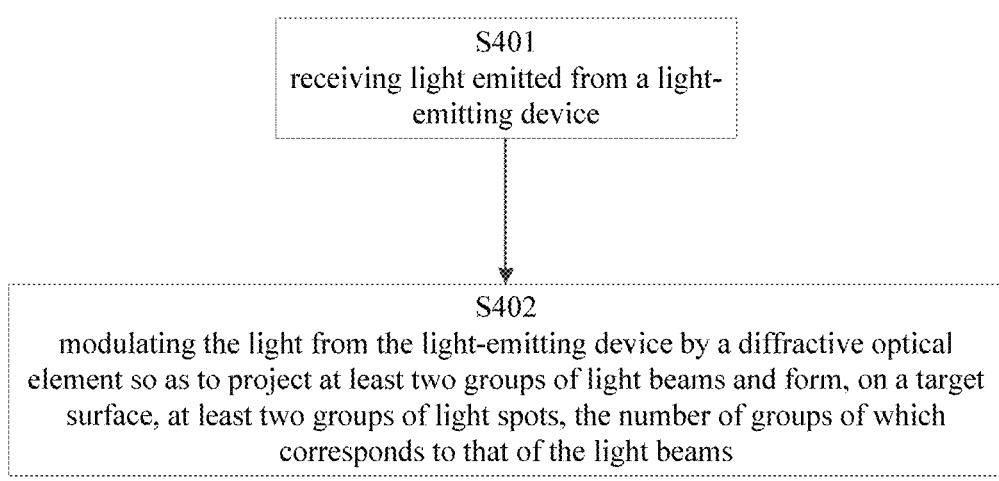
FIG. 9 illustrates a light modulation method according to one example of the present invention.

FIG. 9 illustrates a light modulation method 400 according to one example of the present invention. As shown in FIG. 9, the light modulation method 400 comprises:

In step S401, receiving light emitted from a light-emitting device.

In step S402, modulating the light from the light-emitting device by a diffractive optical element so as to project at least two groups of light beams and form, on a target surface, at least two groups of light spots, the number of groups of which corresponds to that of the light beams, wherein polarization directions between the at least two groups of light beams are different, and/or optical distances from the light-emitting device to the target surface are different.

The light modulation method 400 of this example can be implemented by using the beam-splitting optical modules 100, 200 and 300 as described above.

According to one preferred example of the present invention, the light modulation method 400 further comprises using a polarization modulation element to modulate the light emitted from the light-emitting device into at least two groups of polarized light in different polarization directions, the number of groups of which corresponds to that of the at least two groups of light beams, wherein the diffractive optical element is configured to modulate the at least two groups of polarized light so as to project the at least two groups of light beams, and wherein the polarization modulation element is preferably a polarization grating and/or a polarizing film, and the light-emitting device is preferably a vertical cavity surface emitting laser or an edge emitting laser or an LED. As shown in FIG. 5, the light emitted from the vertical cavity surface emitting laser passes through a polarization modulation element, such as a polarization grating or a polarization film, to form X-direction polarized light and Y-direction polarized light. The diffractive optical element is designed for polarized light, and projects different beams according to different polarization directions to form corresponding light spots.

The present invention makes no limitation of the number of light beams or light spots, both of which may be two groups of light beams and two groups of light spots, or four groups of light beams and four groups of light spots, or may be provided in other numbers. These are all within the protection scope of the present invention.

According to one preferred example of the present invention, the method further comprises using a beam-splitting element provided between the light-emitting device and the diffractive optical element to split received light into at least two groups of beam-split light, the number of groups of which corresponds to that of the at least two groups of light beams, the diffractive optical element being configured to receive the at least two groups of beam-split light, and modulate and project the at least two groups of light beams. The beam-splitting element may be a polarization beam-splitting element configured to split the received light into at least two groups of polarized light in different polarization directions. The beam-splitting element may also be a non-polarization optical splitter.

According to one preferred example of the present invention, the diffractive optical element is configured to modulate incident light in different polarization directions so as to form a pattern of at least two distinguishing groups of light spots on the target surface.

Figure 10:
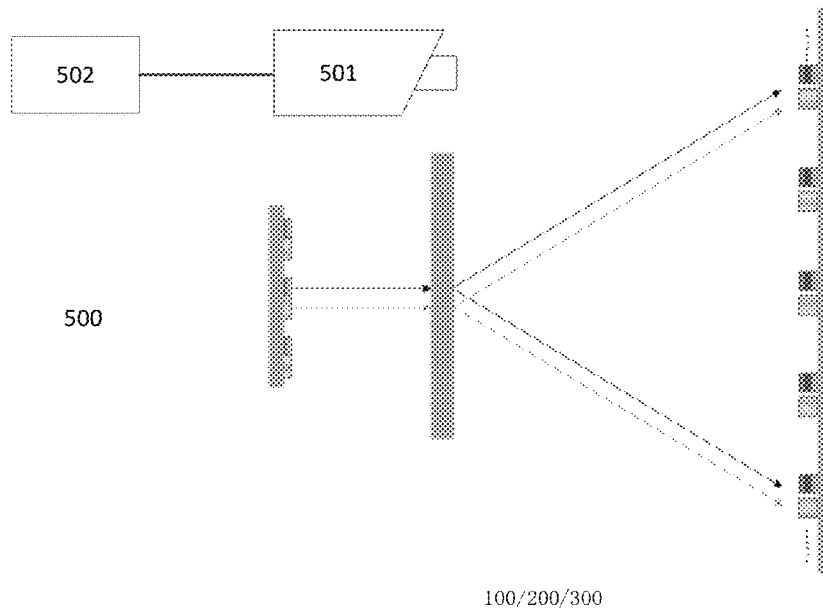
FIG. 10 illustrates an electronic device according to an alternative example of the present invention.

FIG. 10 illustrates an electronic device 500 according to an alternative example of the present invention, comprising a beam-splitting optical module 100/200/300, a camera 501, and a processing unit 502 as described above. The electronic device 500 may be a mobile phone, PAD, laptop, desktop computer, monitoring system and other types of electronic devices. After the beam-splitting optical module projects at least two groups of light spots on the target surface, the camera 501 acquires a pattern formed by the light spots, and the pattern are then processed and analyzed by the processing unit 502. The example of the present invention may be used for various purposes, such as unlocking, facial recognition, monitoring and other applications by acquiring the pattern of light spots after structured light is projected. It may be a polarization receiver or a common receiver. If it is a common receiver, then images can be simply gathered together for processing. If it is a polarization receiver, the physical polarization attribute information is also recorded to make the same act as a more accurate three-dimensional sensor.

Figure 11:
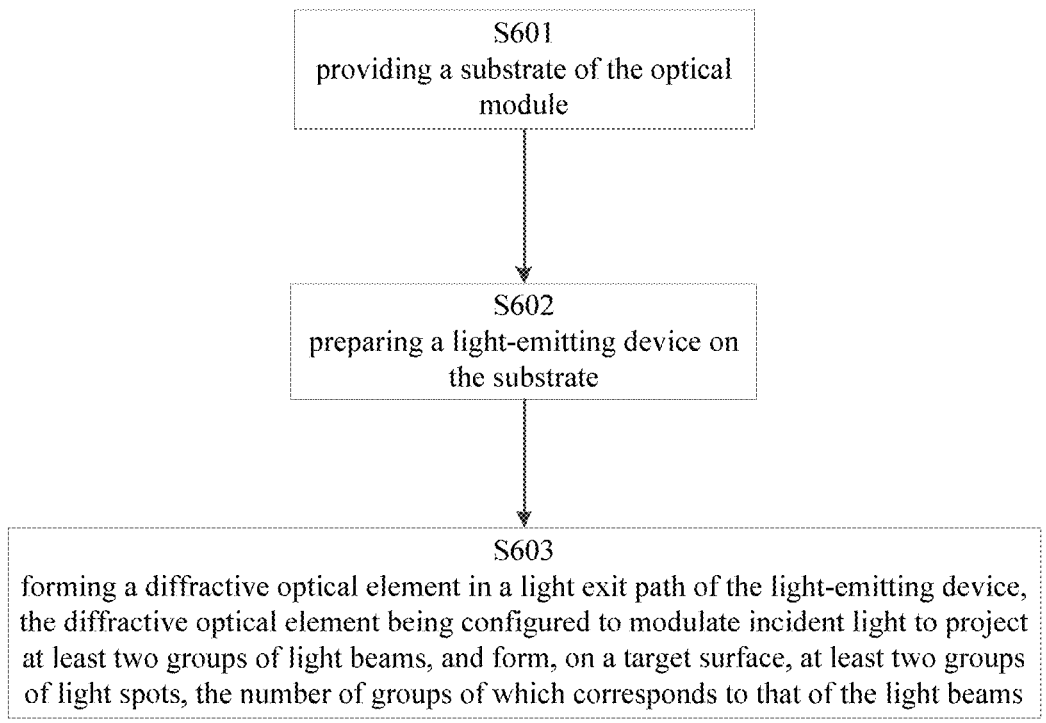
FIG. 11 illustrates a manufacturing method of a beam-splitting optical module according to one example of the present invention.

FIG. 11 illustrates a manufacturing method 600 of a beam-splitting optical module according to one example of the present invention. As shown in FIG. 11, in step S601, a substrate of the optical module is provided; in step S602, a light-emitting device is prepared on the substrate; and in step S603, a diffractive optical element is formed in a light exit path of the light-emitting device, the diffractive optical element being configured to modulate incident light to project at least two groups of light beams, and form, on a target surface, at least two groups of light spots, the number of groups of which corresponds to that of the light beams, wherein polarization directions between the at least two groups of light beams are different, and/or optical distances from the light-emitting device to the target surface are different.

According to one example of the present invention, the manufacturing method 600 further comprises: providing a polarization modulation element between the light-emitting device and the diffractive optical element, the polarization modulation element being configured to modulate light emitted from the light-emitting device into at least two groups of polarized light in different polarization directions, the number of groups of which corresponds to that of the at least two groups of light beams, and the diffractive optical element being configured to modulate the at least two groups of polarized light so as to project the at least two groups of light beams, wherein the polarization modulation element is preferably a polarization grating and/or a polarizing film, and the light-emitting device is preferably a vertical cavity surface emitting laser or an edge emitting laser or an LED.

According to one example of the present invention, the manufacturing method 600 further comprises: providing a beam-splitting element between the light-emitting device and the diffractive optical element, the beam-splitting element being configured to split received light into at least two groups of beam-split light, the number of groups of which corresponds to that of the at least two groups of light beams, and the diffractive optical element being configured to receive the at least two groups of beam-split light, and modulate and project the at least two groups of light beams.

Figure 12:
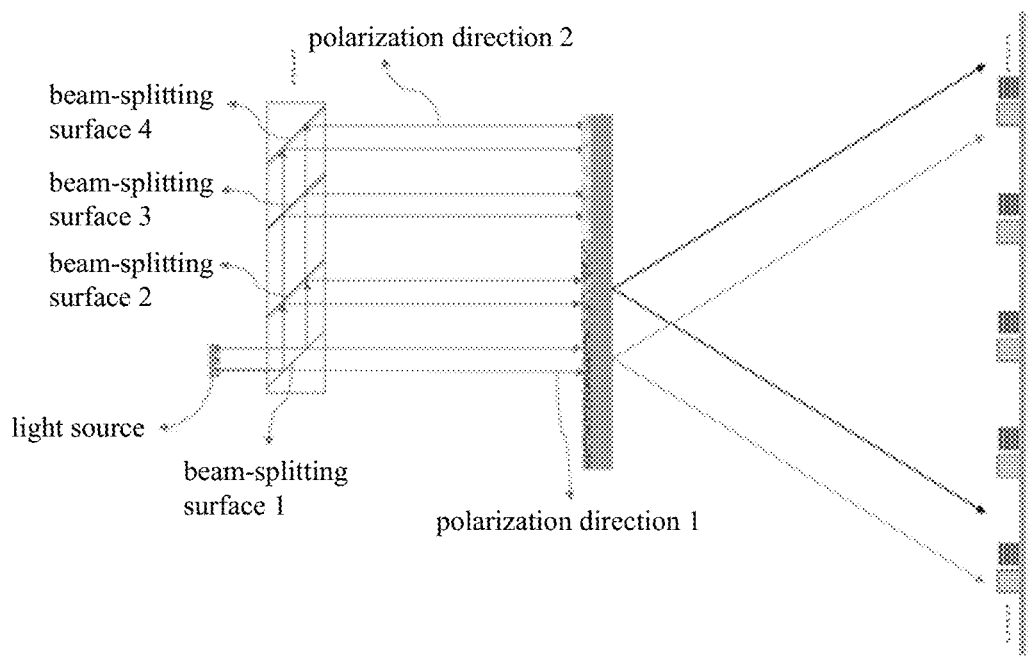
FIG. 12 illustrates a beam-splitting optical module according to an alternative example of the present invention.

FIG. 12 illustrates a beam-splitting optical module 700 according to an alternative example of the present invention, similar to the beam-splitting optical module 300 as shown in FIG. 8. As compared with the beam-splitting optical module 300 of FIG. 8, the beam-splitting optical module 700 of FIG. 12 comprises a plurality of beam-splitting surfaces, such as beam-splitting surface 1, beam-splitting surface 2, beam-splitting surface 3, beam-splitting surface 4 or more beam-splitting surfaces as shown in the figure. By providing a plurality of beam-splitting surfaces, light beams emitted from the light source can be split into multiple groups of light beams having different optical distances. As shown in FIG. 12, there are four groups of light beams incident on different areas of the surface of the diffractive optical element respectively. Correspondingly, there are different microstructures in the different areas on the surface of the diffractive optical element according to the difference between the optical distances of the incident light beams, which modulate the incident light beams correspondingly so as to form different focal lengths, project different groups of light beams and form a corresponding number of light spots on the target surface. Or each beam-splitting surface may be a polarization beam-splitting surface that, for example, splits light beams emitted from the light source into polarized light in multiple polarization directions. In this case, it becomes unnecessary that different microstructures exist in different areas on the surface of the diffractive optical element. As the case may be shown in FIGS. 1 and 2, when light beams in different polarization directions incident on the diffractive optical element, the diffractive optical element will perform corresponding modulation according to the polarization direction of the incident light. By adding a number of beam-splitting surfaces, each light beam corresponds to a different focal length, and the combination of a long focal length and a short focal length can increase the coverage.

Described above are only ideal embodiments of the present invention, which do not limit the present invention. Any modification, equivalent replacement, improvement, if only falling into the spirit and principles as stated herein, should be included in the protection scope of the present invention.

Last but not least, it should be noted that the contents described above are just preferred examples of the present invention, and are not used to limit the present invention. Although the detailed description of the present invention has been provided with reference to the foregoing examples, those skilled in the art still may make modifications to the technical solutions recorded in various examples described above, or conduct equivalent replacement of some technical features therein. Any modification, equivalent replacement, or improvement, if only falling into the spirit and principles as stated herein, should be included in the protection scope of the present invention.

We claim:

1. A beam-splitting optical module, comprising:
a light-emitting device, wherein the light-emitting device comprises a polarization modulation element so as to modulate light beams from a single point light source into polarized light in multiple directions;
a diffractive optical element provided in a light exit path of the light-emitting device, and configured to modulate incident light to project at least two groups of light beams, and form, on a target surface, at least two groups of light spots, a number of the at least two groups of light spots corresponds to that of the light beams,
wherein polarization directions of the at least two groups of light beams are different, and optical distances from the light-emitting device to the target surface are different; and
a polarization beam-splitting element provided between the light-emitting device and the diffractive optical element, and configured to split received light into at least two groups of polarized light in different polarization directions, a number of the at least two groups of polarized light corresponds to that of the at least two groups of light beams, the diffractive optical element being configured to receive the at least two groups of polarized light, and modulate and project the at least two groups of light beams.

2. The beam-splitting optical module according to claim 1, wherein the polarization modulation element is configured to modulate light emitted from the light-emitting device into at least two groups of polarized light in different polarization directions, a number of the at least two groups of polarized light corresponds to that of the at least two groups of light beams, and the diffractive optical element is configured to modulate the at least two groups of polarized light so as to project the at least two groups of light beams.

3. The beam-splitting optical module according to claim 1, wherein the at least two groups of light beams comprises only two groups of light beams and the at least two groups of light spots comprises only two groups of light spots, or the at least two groups of light beams is four groups of light beams and the at least two groups of light spots is four groups of light spots.

4. The beam-splitting optical module according to claim 1, wherein the diffractive optical element has at least two areas, a number of the at least two areas corresponds to that of the light spots, and microstructures on the at least two areas are different and are configured to modulate light beams incident thereon having different optical distances respectively.

5. The beam-splitting optical module according to claim 1, wherein the diffractive optical element is configured to modulate incident light in different polarization directions so as to form a pattern of the at least two groups of light spots, between which there is a difference, on the target surface.

6. A light modulation method, comprising:
receiving light emitted from a light-emitting device, wherein the light-emitting device comprises a polarization modulation element so as to modulate light beams from a single point light source into polarized light in multiple directions; and
modulating the light emitted from the light-emitting device by a diffractive optical element to project at least two groups of light beams and form, on a target surface, at least two groups of light spots, a number of the at least two groups of light spots corresponds to that of the light beams,
wherein polarization directions of the at least two groups of light beams are different, and optical distances from the light-emitting device to the target surface are different; and
splitting received light into at least two groups of polarized light in different polarization directions by a polarization beam-splitting element provided between the light-emitting device and the diffractive optical element, a number of the at least two groups of polarized light corresponds to that of the at least two groups of light beams, the diffractive optical element being configured to receive the at least two groups of polarized light, and modulate and project the at least two groups of light beams.

7. The light modulation method according to claim 6, further comprising modulating the light emitted from the light-emitting device into at least two groups of polarized light in different polarization directions by the polarization modulation element, a number of the at least two groups of polarized light corresponds to that of the at least two groups of light beams, the diffractive optical element being configured to modulate the at least two groups of polarized light so as to project the at least two groups of light beams.

8. The light modulation method according to claim 7, wherein the diffractive optical element is configured to modulate incident light in different polarization directions so as to form a pattern of the at least two distinguishing groups of light spots, between which there is a difference, on the target surface.

9. The light modulation method according to claim 6, wherein the at least two groups of light beams comprises only two groups of light beams and the at least two groups of light spots comprises only two groups of light spots, or the at least two groups of light beams is four groups of light beams and the at least two groups of light spots is four groups of light spots.

10. The light modulation method according to claim 6, wherein the polarization modulation element is a polarization grating or a polarizing film, and the light-emitting device is a vertical cavity surface emitting laser or an edge emitting laser or an LED.

11. A manufacturing method of a beam-splitting optical module, comprising:
providing a substrate of the optical module;
preparing a light-emitting device on the substrate, wherein the light-emitting device comprises a polarization modulation element so as to modulate light beams from a single point light source into polarized light in multiple directions; and
forming a diffractive optical element in a light exit path of the light-emitting device, the diffractive optical element being configured to modulate incident light to project at least two groups of light beams and form, on a target surface, at least two groups of light spots, a number of the at least two groups of light spots corresponds to that of the light beams, wherein polarization directions of the at least two groups of light beams are different, and optical distances from the light-emitting device to the target surface are different; and
providing a polarization beam-splitting element between the light-emitting device and the diffractive optical element, the polarization beam-splitting element being configured to split received light into at least two groups of polarized light in different polarization directions, a number of the at least two groups of polarized light corresponds to that of the at least two groups of light beams, and the diffractive optical element being configured to receive the at least two groups of polarized light, and modulate and project the at least two groups of light beams.

12. The manufacturing method according to claim 11, wherein the polarization modulation element is configured to modulate light emitted from the light-emitting device into at least two groups of polarized light in different polarization directions, a number of the at least two groups of polarized light corresponds to that of the at least two groups of light beams, and the diffractive optical element is configured to modulate the at least two groups of polarized light so as to project the at least two groups of light beams.

13. The manufacturing method according to claim 11, wherein the polarization modulation element is a polarization grating or a polarizing film, and the light-emitting device is a vertical cavity surface emitting laser or an edge emitting laser or an LED.

* * * * *